United States Patent
Oda et al.

(10) Patent No.: US 9,193,893 B2
(45) Date of Patent: Nov. 24, 2015

(54) BLOCK COPOLYMER COMPOSITION FOR HOT MELT ADHESIVE

(71) Applicant: ZEON CORPORATION, Tokyo (JP)

(72) Inventors: Ryouji Oda, Tokyo (JP); Ayako Furuko, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/368,235

(22) PCT Filed: Dec. 26, 2012

(86) PCT No.: PCT/JP2012/083705
§ 371 (c)(1),
(2) Date: Jun. 23, 2014

(87) PCT Pub. No.: WO2013/099973
PCT Pub. Date: Jul. 4, 2013

(65) Prior Publication Data
US 2014/0350164 A1    Nov. 27, 2014

(30) Foreign Application Priority Data
Dec. 29, 2011  (JP) ................. 2011-290367

(51) Int. Cl.
C08L 53/00     (2006.01)
C08L 9/00      (2006.01)
C09J 153/02    (2006.01)
C08L 53/02     (2006.01)
C08F 293/00    (2006.01)
C08F 297/04    (2006.01)

(52) U.S. Cl.
CPC ............. C09J 153/02 (2013.01); C08F 293/00 (2013.01); C08F 297/046 (2013.01); C08L 53/02 (2013.01); C08L 2205/02 (2013.01)

(58) Field of Classification Search
CPC ............................... C09J 153/02; C08F 293/00
USPC ........................................................ 524/505
See application file for complete search history.

(56) References Cited

U.S. PATENT DOCUMENTS

2011/0257337 A1* 10/2011 Oda et al. .......... 525/98
2011/0319549 A1* 12/2011 Oda et al. .......... 524/505

FOREIGN PATENT DOCUMENTS

| JP | 8-283685 A | 10/1996 |
| JP | 10-30079 A | 2/1998 |
| JP | 2001-504519 A | 4/2001 |
| WO | WO 97/30844 A1 | 8/1997 |
| WO | WO 2010/113883 A1 | 10/2010 |

OTHER PUBLICATIONS

International Search Report for PCT/JP2012/083705 mailed on Apr. 16, 2013.

* cited by examiner

*Primary Examiner* — Hui Chin
(74) *Attorney, Agent, or Firm* — Birch, Stewart, Kolasch & Birch, LLP

(57) ABSTRACT

Disclosed is a block copolymer composition for a hot melt adhesive, comprising a block copolymer A and a block copolymer B each having a particular structure, characterized in that the aromatic vinyl monomer unit content of the block copolymer A is 30% to 50% by weight; the aromatic vinyl monomer unit content of the block copolymer B is 15% to 25% by weight; a content of the aromatic vinyl monomer units relative to all polymer components of the block copolymer composition is 18% to 45% by weight; the weight ratio (A/B) of the block copolymer A with respect to the block copolymer B is 20/80 to 80/20; and the ratio (MwA/MwB) of the weight average molecular weight of the block copolymer A (MwA) with respect to the weight average molecular weight of the block copolymer B (MwB) is 0.65 to 1.5.

3 Claims, No Drawings

BLOCK COPOLYMER COMPOSITION FOR HOT MELT ADHESIVE

TECHNICAL FIELD

The present invention relates to a block copolymer composition for a hot melt adhesive. More particularly, the invention relates to a block copolymer composition for a hot melt adhesive, the copolymer composition capable of providing a hot melt adhesive composition having excellent softening agent holding properties, heat resistance and transparency and being particularly suitable as an adhesive for labeling.

BACKGROUND ART

Hot melt adhesives are adhesives that are able to adhere various products efficiently since they solidify in a short time, and are highly safe to human body since the adhesives do not require solvents. Therefore, hot melt adhesives are used in a variety of fields.

In regard to hot melt adhesives, it is known that various thermoplastic resins can be used as base polymers, but one of representative examples of the base polymers may be an aromatic vinyl-conjugated diene-aromatic vinyl triblock copolymer such as a styrene-isoprene-styrene triblock copolymer or a styrene-butadiene-styrene triblock copolymer. A hot melt adhesive using this aromatic vinyl-conjugated diene-aromatic vinyl triblock copolymer as a base polymer has excellent adaptability particularly to high-speed continuous production or excellent initial tack strength, and is therefore widely used. In this regard, various investigations have been conducted in order to improve various characteristics.

For example, Patent Literature 1 describes that when a tackifying agent, a diluent and a stabilizer are incorporated at particular proportions to an aromatic vinyl-conjugated diene-aromatic vinyl copolymer having aromatic vinyl copolymer blocks with mutually different molecular weights, a hot melt adhesive which has excellent low temperature adhesion level or the like and is suitable for the production of disposable products such as paper diapers may be obtained. Furthermore, Patent Literature 2 describes that when a hot melt adhesive composition is formed by incorporating a compatible polymer, a tackifying resin, a plasticizer and the like to a radial styrene-isoprene-styrene block copolymer, a hot melt adhesive composition which can be applied at a relatively low temperature and is suitable for label adhesion to bottles is obtained. Furthermore, Patent Literature 3 describes that when a pressure-sensitive adhesive is formed by incorporating a tackifying agent, a styrene-isoprene block copolymer, a plasticizer and the like to a styrene-isoprene-styrene block copolymer, a pressure-sensitive adhesive which can be easily cut by a die and is suitable for labeling is obtained. In addition, Patent Literature 4 describes that when an adhesive composition for labeling is formed by incorporating a particular polymer, a tackifying agent, a softening agent and the like to an aromatic vinyl-conjugated diene-aromatic vinyl block copolymer having a particular structure, an adhesive composition for labeling which can be easily applied at low temperatures and has satisfactory die-cutting performance is obtained.

However, in regard to the adhesive compositions formed by incorporating a softening agent (diluent/plasticizer) and the like to a block copolymer as described in Patent Literatures 1 to 4, incorporation of a softening agent contributes to lowering of the coatable temperature or an increase in tackiness; however, when the amount of incorporation of the softening agent is increased, there is a problem that the softening agent bleeds out and contaminates the object to be adhered. Furthermore, in regard to the improved adhesive compositions described in Patent Literatures 1 to 4, in a case in which adhesion has been conducted under high temperature conditions, or in a case in which an adherend has been stored under high temperature conditions, there are occasions in which problems such as detachment of the object to be adhered or flowing out of the adhesive composition, may occur. Furthermore, there are also occasions in which the improved adhesive compositions described in Patent Literatures 1 to 4 deteriorate designability of an adherend due to the lack of transparency. Under such circumstances as described above, in hot melt adhesives using an aromatic vinyl-conjugated diene-aromatic vinyl triblock copolymer as a base polymer, there is a strong demand for improvements in the performance in which an incorporated softening agent does not easily bleed (softening agent holding properties), heat resistance and transparency.

CITATION LIST

Patent Literatures

Patent Literature 1: Japanese Patent Application Publication (JP-A) No. H08-283685
Patent Literature 2: JP-A NO. H10-030079
Patent Literature 3: JP-A (Japanese Translation of PCT International Application) No. 2001-504519
Patent Literature 4: WO 2010/113883

SUMMARY OF INVENTION

Technical Problem

An object of the present invention is to provide a block copolymer composition for a hot melt adhesive, which can provide a hot melt adhesive composition having excellent softening agent holding properties, heat resistance and transparency.

Solution to Problem

The inventors of the present invention conducted a thorough investigation in order to achieve the objects described above, and as a result, they found that when a block copolymer composition is formed using an asymmetric aromatic vinyl-conjugated diene-aromatic vinyl triblock copolymer in which two aromatic vinyl polymer blocks have different weight average molecular weights, and an aromatic vinyl-conjugated diene diblock copolymer, and a particular configuration such as causing the polymer blocks of each of the block copolymers to have weight average molecular weights in particular ranges, is introduced, a block copolymer composition which can provide a hot melt adhesive composition having excellent in all of softening agent holding properties, heat resistance and transparency, is obtained. The present invention was completed based on this finding.

Thus, according to the present invention, there is provided a block copolymer composition for a hot melt adhesive, comprising a block copolymer A represented by the following formula (A) and a block copolymer B represented by the following formula (B), characterized in that an aromatic vinyl monomer unit content of the block copolymer A is 30% to 50% by weight, an aromatic vinyl monomer unit content of the block copolymer B is 15% to 25% by weight, a content of the aromatic vinyl monomer units relative to all the polymer components of the block copolymer composition is 18% to 45% by weight, a weight ratio (A/B) of the block copolymer A with respect to the block copolymer B is 20/80 to 80/20, and a ratio (MwA/MwB) of a weight average molecular weight of the block copolymer A (MwA) with respect to a weight average molecular weight of the block copolymer B (MwB) is 0.65 to 1.5:

$$Ar1^a\text{-}D^a\text{-}Ar2^a \quad (A)$$

$$Ar^b\text{-}D^b \quad (B).$$

In the formula (A) and the formula (B), $Ar1^a$ and $Ar^b$ each represent an aromatic vinyl polymer block having a weight average molecular weight of 10,000 to 18,000; $Ar2^a$ represents an aromatic vinyl polymer block having a weight average molecular weight of 20,000 to 40,000, with the difference between the weight average molecular weight of $Ar2^a$ and the weight average molecular weight of $Ar1^a$ being 5,000 to 30,000; and $D^a$ and $D^b$ each represent a conjugated diene polymer block having a weight average molecular weight of 80,000 to 150,000.

Furthermore, according to the present invention, there is provided a hot melt adhesive composition including 100 parts by weight of the block copolymer composition for a hot melt adhesive described above, 30 parts to 800 parts by weight of a tackifying resin, and 10 parts to 500 parts by weight of a softening agent.

The hot melt adhesive composition is preferably used as an adhesive for a label.

Advantageous Effects of Invention

According to the present invention, a block copolymer composition for a hot melt adhesive, which can provide a hot melt adhesive composition having excellent softening agent holding properties, heat resistance and transparency, can be provided.

DESCRIPTION OF EMBODIMENTS

The block copolymer composition for a hot melt adhesive of the present invention comprises at least a block copolymer A and a block copolymer B. The block copolymer A, which is one of the essential components that constitute the block copolymer composition of the present invention, is an aromatic vinyl-conjugated diene-aromatic vinyl triblock copolymer having two aromatic vinyl polymer blocks with mutually different average molecular weights, represented by the following formula (A).

$$Ar1^a\text{-}D^a\text{-}Ar2^a \quad (A)$$

In the above formula (A), $Ar1^a$ represents an aromatic vinyl polymer block having a weight average molecular weight of 10,000 to 18,000; $Ar2^a$ represents an aromatic vinyl polymer block having a weight average molecular weight of 20,000 to 40,000, with the difference between the weight average molecular weight of $Ar2^a$ and the weight average molecular weight of $Ar1^a$ being 5,000 to 30,000; and $D^a$ represents a conjugated diene polymer block having a weight average molecular weight of 80,000 to 150,000.

The block copolymer B, which is another essential component that constitutes the block copolymer composition of the present invention, is an aromatic vinyl-conjugated diene diblock copolymer formed by an aromatic vinyl polymer block bonded to a conjugated diene polymer block, each having a particular weight average molecular weight, represented by the following formula (B).

$$Ar^b\text{-}D^b \quad (B)$$

In the above formula (B), $Ar^b$ represents an aromatic vinyl polymer block having a weight average molecular weight of 10,000 to 18,000; and $D^b$ represents a conjugated diene polymer block having a weight average molecular weight of 80,000 to 150,000.

The aromatic vinyl polymer block of the block copolymer A and the block copolymer B is a polymer block containing an aromatic vinyl monomer unit as a main constituent unit. Examples of the aromatic vinyl monomer used to constitute the aromatic vinyl monomer unit of the aromatic vinyl polymer block include, but are not particularly limited to, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinylnaphthalene. Among these, it is preferable to use styrene. These aromatic vinyl monomers can be used singly or in combination of two or more kinds thereof for each aromatic vinyl polymer block. Furthermore, for the various aromatic vinyl polymer blocks, the same aromatic vinyl monomer may be used, or different aromatic vinyl monomers may be used.

The aromatic vinyl polymer blocks of the block copolymer A and the block copolymer B may respectively include a monomer unit other than the aromatic vinyl monomer unit. Examples of the monomer that constitutes the monomer unit other than the aromatic vinyl monomer unit that can be included in an aromatic vinyl polymer block, include conjugated diene monomers such as 1,3-butadiene and isoprene (2-methyl-1,3-butadiene); α,β-unsaturated nitrile monomers, unsaturated carboxylic acid or acid anhydride monomers, unsaturated carboxylic acid ester monomers, and non-conjugated diene monomers. The content of the monomer unit other than the aromatic vinyl monomer unit in the various aromatic vinyl polymer block is not particularly limited as long as the aromatic vinyl monomer unit is the main constituent unit, but the content is preferably 20% by weight or less, more preferably 10% by weight or less, and particularly preferably substantially 0% by weight.

The conjugated diene polymer block of the block copolymer A and the block copolymer B is a polymer block containing a conjugated diene monomer unit as a main constituent unit. The conjugated diene monomer used to constitute the conjugated diene monomer unit of the conjugated diene polymer block is not particularly limited as long as it is a conjugated diene compound, but examples include 1,3-butadiene, isoprene, 2,3-dimethyl-1,3-butadiene, 2-chloro-1,3-butadiene, 1,3-pentadiene, and 1,3-hexadiene. Among these, it is preferable to use 1,3-butadiene and/or isoprene, and it is particularly preferable to use isoprene. When the conjugated diene polymer block is formed from an isoprene unit, the hot melt adhesive composition thus obtainable acquires excellent adhesiveness and flexibility. These conjugated diene monomers can be respectively used singly or in combination of two or more kinds thereof for each conjugated diene polymer block. Furthermore, for each conjugated diene polymer block, the same conjugated diene monomer may be used, or different conjugated diene monomers may be used. In addition, some of the unsaturated bonds of each conjugated diene polymer block may be subjected to a hydrogenation reaction.

The conjugated diene polymer blocks of the block copolymer A and the block copolymer B may respectively include a monomer unit other than the conjugated diene monomer unit. Examples of the monomer that constitutes the monomer unit other than the conjugated diene monomer unit that can be included in a conjugated diene polymer block, include aromatic vinyl monomers such as styrene and α-methylstyrene; α,β-unsaturated nitrile monomers, unsaturated carboxylic acid or acid anhydride monomers; unsaturated carboxylic acid ester monomers, and non-conjugated diene monomers. The content of the monomer unit other than the conjugated diene monomer unit in the respective conjugated diene polymer blocks is not particularly limited as long as the conjugated diene monomer unit is a main constituent unit, but the content is preferably 20% by weight or less, more preferably 10% by weight or less, and particularly preferably substantially 0% by weight.

Incidentally, each of the block copolymer A and the block copolymer B may be a copolymer produced using an arbitrary coupling agent, or may be a copolymer produced without using a coupling agent. That is, the block copolymer A and the block copolymer B may respectively contain a residue of a coupling agent within the various polymer blocks or between the various polymer blocks, or may not contain a residue of a coupling agent. However, from the viewpoint of making the hot melt adhesive composition thus obtainable has excellent heat resistance and transparency, it is preferable that both the block copolymer A and the block copolymer B be copolymers produced without using a coupling agent, and do not contain a residue of a coupling agent within the various polymer blocks and between the various polymer blocks.

The block copolymer A that constitutes the block copolymer composition of the present invention is, as represented by the above formula (A), an asymmetric aromatic vinyl-conjugated diene-aromatic vinyl triblock copolymer having a configuration in which an aromatic vinyl polymer block having a relatively smaller weight average molecular weight ($Ar1^a$), a conjugated diene polymer block ($D^a$), and an aromatic vinyl polymer block having a relatively larger weight average molecular weight ($Ar2^a$) are arranged in this sequence. The weight average molecular weight ($Mw(Ar1^a)$) of the aromatic vinyl polymer block having a relatively smaller weight average molecular weight ($Ar1^a$) is 10,000 to 18,000, preferably 11,000 to 17,500, and more preferably 12,000 to 17,000. If $Mw(Ar1^a)$ is too small, there is a risk that the hot melt adhesive composition thus obtainable may have lower holding power as an adhesive, and if $Mw(Ar1^a)$ is too large, there is a risk that the melt viscosity of the hot melt adhesive composition may increase markedly. Furthermore, the weight average molecular weight ($Mw(Ar2^a)$) of the aromatic vinyl polymer block having a relatively large weight average molecular weight ($Ar2^a$) is 20,000 to 40,000, preferably 21,000 to 38,000, and more preferably 22,000 to 37,000. If $Mw(Ar2^a)$ is too small, there is a risk that the hot melt adhesive composition thus obtainable may have a relatively high melt viscosity at a low temperature, and if $Mw(Ar2^a)$ is too large, there is a risk that the holding power as an adhesive, softening agent holding properties, and transparency may be deteriorated. Furthermore, the weight average molecular weight ($MwAr2^a$)) of the aromatic vinyl polymer block having a relatively large weight average molecular weight ($Ar2^a$) is such that the difference between the relevant weight average molecular weight and the weight average molecular weight ($Mw(Ar1^a)$) of the aromatic vinyl polymer block having a relatively smaller weight average molecular weight ($Ar1^a$) ($Mw(Ar2^a)-Mw(Ar1^a)$) needs to be 5,000 to 30,000, this difference ($Mw(Ar2^a)-Mw(Ar1^a)$) is preferably 6,000 to 29,000, and more preferably 7,000 to 28,000. If $Mw(Ar2^a)-Mw(Ar1^a)$ is too small, there is a risk that the hot melt adhesive composition thus obtainable may have inferior holding power as an adhesive and inferior heat resistance, and if the difference is too large, there is a risk that the holding power as an adhesive, softening agent holding properties, and transparency may be deteriorated.

Incidentally, in the present invention, the weight average molecular weight of the polymer or polymer block will be determined as a value measured by high performance liquid chromatography and calculated relative to polystyrene standards.

The vinyl bond content of the conjugated diene polymer block ($D^a$) of the block copolymer A (the content of 1,2-vinyl bonds and 3,4-vinyl bonds relative to all conjugated diene monomer units) is not particularly limited, but the vinyl bond content is usually 1% to 20% by mole, preferably 2% to 15% by mole, and more preferably 3% to 10% by mole. If this vinyl bond content is too large, there is a risk that the hot melt adhesive composition thus obtainable may become too hard, and may have a lower adhesion level.

The weight average molecular weight ($Mw(D^a)$) of the conjugated diene polymer block ($D^a$) of the block copolymer A needs to be 80,000 to 150,000, and is preferably 85,000 to 140,000, and more preferably 90,000 to 130,000. If $Mw(D^a)$ is too small, there is a risk that the hot melt adhesive composition thus obtainable may have a low initial tack strength, and if $Mw(D^a)$ is too large, there is a risk that the hot melt adhesive composition may have a relatively high melt viscosity at a low temperature.

The aromatic vinyl monomer unit content of the block copolymer A (content of the aromatic vinyl monomer unit relative to all monomer units that constitute the block copolymer A) needs to 30% to 50% by weight, and is preferably 32% to 48% by weight, and more preferably 33% to 47% by weight. If the aromatic vinyl monomer unit content of the block copolymer A is too small, there is a risk that the hot melt adhesive composition thus obtainable may have inferior holding power as an adhesive, softening agent holding properties and heat resistance, and if the content is too large, there is a risk that the hot melt adhesive composition may have a low initial tack strength or a low adhesion level.

The overall weight average molecular weight of the block copolymer A (MwA) is not particularly limited as long as the relevant weight average molecular weight has a particular relationship to the weight average molecular weight of the block copolymer B (MwB) as will be described below, but the weight average molecular weight (MwA) is usually 110,000 to 208,000, preferably 117,000 to 195,500, and more preferably 124,000 to 184,000.

Incidentally, the block copolymer A that constitutes the block copolymer composition of the present invention may be composed of only one kind of block copolymer A having a substantially single configuration, or may be composed of two or more kinds of block copolymer A having substantially different configurations.

The block copolymer B represented by the above formula (B) is an aromatic vinyl-conjugated diene diblock copolymer formed by binding an aromatic vinyl polymer block ($Ar^b$) having a particular weight average molecular weight and a conjugated diene polymer block ($D^b$). The weight average molecular weight ($Mw(Ar^b)$) of the aromatic vinyl polymer block ($Ar^b$) that constitutes the block copolymer B is 10,000 to 18,000, and is preferably 11,000 to 17,500, and more preferably 12,000 to 17,000. If $Mw(Ar^b)$ is too small, there is a risk that the hot melt adhesive composition thus obtainable may have inferior holding power as an adhesive, and if $Mw(Ar^b)$ is too large, there is a risk that the hot melt adhesive composition may have a relatively high melt viscosity at a low temperature. Furthermore, it is more preferable that the weight average molecular weight ($Mw(Ar^b)$) of the aromatic vinyl polymer block of the block copolymer B be substantially equal to the weight average molecular weight (Mw(Ar1$^a$)) of the aromatic vinyl polymer block having a relatively smaller weight average molecular weight (Ar1$^a$) of the block copolymer A.

The vinyl bond content of the conjugated diene polymer block (D$^b$) (content of by 1,2-vinyl bonds and 3,4-vinyl bonds relative to all conjugated diene monomer units) of the block copolymer B is not particularly limited, but the vinyl bond content is usually 1% to 20% by mole, preferably 2% to 15% by mole, and more preferably 3% to 10% by mole. If this vinyl bond content is too large, there is a risk that the hot melt adhesive composition thus obtainable may become too hard, and may have inferior adhesion level. Furthermore, it is preferable that the vinyl bond content of the conjugated diene polymer block (D$^b$) of the block copolymer B be substantially equal to the vinyl bond content of the conjugated diene polymer block (D$^a$) of the block copolymer A.

The weight average molecular weight (Mw(D$^b$)) of the conjugated diene polymer block (D$^b$) of the block copolymer B needs to be 80,000 to 150,000, and is preferably 85,000 to 140,000, and more preferably 90,000 to 130,000. If Mw(D$^b$) is too small, there is a risk that the hot melt adhesive composition thus obtainable may have inferior softening agent holding power, and if Mw(D$^b$) is too large, there is a risk that the hot melt adhesive composition may have a relatively higher melt viscosity at a low temperature. Furthermore, it is preferable that the weight average molecular weight (Mw(D$^b$)) of the conjugated diene polymer block (D$^b$) of the block copolymer B be substantially equal to the weight average molecular weight (Mw(D$^a$)) of the conjugated diene polymer (D$^a$) of the block copolymer A.

The aromatic vinyl monomer unit content of the block copolymer B (content of the aromatic vinyl monomer units relative to all monomer units that constitute the block copolymer B) needs to be 15% to 25% by weight, and is preferably 16% to 24% by weight, and more preferably 17% to 23% by weight. If the aromatic vinyl monomer unit content of the block copolymer B is too small, there is a risk that the hot melt adhesive composition thus obtainable may have inferior holding power as an adhesive, softening agent holding properties and heat resistance, and if the content is too large, there is a risk that the hot melt adhesive composition may have a low initial tack strength or a low adhesion level.

The overall weight average molecular weight of the block copolymer B (MwB) is not particularly limited as long as the relevant weight average molecular weight has a particular relationship to the weight average molecular weight of the block copolymer A (MwA) as will be described below, but the weight average molecular weight (MwB) is usually 90,000 to 168,000, preferably 96,000 to 157,500, and more preferably 101,000 to 147,000.

Incidentally, the block copolymer B that constitutes the block copolymer composition of the present invention may be composed of only one kind of block copolymer B having a substantially single configuration, or may be composed of two or more kinds of block copolymer B having substantially different configurations.

In the block copolymer composition of the present invention, the weight ratio (A/B) of the block copolymer A with respect to the block copolymer B needs to be in the range of 20/80 to 80/20, and is preferably in the range of 25/75 to 75/25, and more preferably in the range of 30/70 to 70/30. If this ratio is too small, there is a risk that the hot melt adhesive composition thus obtainable may have inferior holding power as an adhesive and inferior heat resistance, and if this ratio is too large, there is a risk that the hot melt adhesive composition may have a low initial adhesive or a low adhesion level.

In regard to the block copolymer composition of the present invention, the ratio (MwA/MwB) of the weight average molecular weight of the block copolymer A (MwA) with respect to the weight average molecular weight of the block copolymer B (MwB) needs to 0.65 to 1.5, and the ratio is preferably 0.75 to 1.4, and more preferably 0.85 to 1.33. In the block copolymer composition of the present invention since the weight average molecular weight of the block copolymer (MwA) and the weight average molecular weight of the block copolymer B (MwB) are in such a relationship, the softening agent holding properties and heat resistance of the hot melt adhesive composition thus obtainable are highly well-balanced. On the other hand, if this ratio (MwA/MwB) is too small, there is a risk that the hot melt adhesive composition thus obtainable may have a relatively high melt viscosity at a low temperature, and may have inferior heat resistance. If the ratio is too large, there is a risk that the hot melt adhesive composition may have inferior softening holding properties.

The molecular weight distribution that is expressed as the ratio (Mw/Mn) between the weight average molecular weight (Mw) and the number average molecular weight (Mn) of the various polymer blocks constituting the block copolymer A and the block copolymer B is not particularly limited, but the molecular weight distribution is, in each case, usually 1.1 or less, and preferably 1.05 or less.

The block copolymers that constitute the block copolymer composition of the present invention may be only the block copolymer A and the block copolymer B, but the block copolymer composition may also include a block copolymer other than the block copolymer A and the block copolymer B. Examples of such a block copolymer include, but are not limited to, an aromatic vinyl-conjugated diene-aromatic vinyl triblock copolymer having a configuration that is different from that of the block copolymer A, or a radial aromatic vinyl-conjugated diene block copolymer. In regard to the block copolymer composition of the present invention, the amount of the block copolymer other than the block copolymer A and the block copolymer B is preferably 20% by weight or less, and more preferably 10% by weight or less.

In regard to the block copolymer composition of the present invention comprising the block copolymer A, the block copolymer B, and the block copolymer other than the block copolymer A and the block copolymer B that can be optionally incorporated, the content of the aromatic vinyl monomer units in the total amount of the relevant block copolymers, that is, the content of the aromatic vinyl monomer units relative to all polymer components of the block copolymer composition (in the following descriptions, may be referred to as "overall content of aromatic vinyl monomer units") needs to be 18% to 45% by weight, and the content is preferably 20% to 43% by weight, and more preferably 21% to 42% by weight. If the overall content of aromatic vinyl monomer units is too small, there is a risk that the hot melt adhesive composition thus obtainable may have inferior holding power as an adhesive, and if the content is too large, there is a risk that the hot melt adhesive composition thus obtainable may become too hard, and may have an inferior adhesion level. This overall content of aromatic vinyl monomer units can be easily adjusted by adjusting the amounts of incorporation of the various block copolymers while considering the contents of the aromatic vinyl monomer units of the various block copolymers that constitute the block copolymer composition. Incidentally, in a case in which all of the polymer components that constitute the block copolymer composition are composed only of aromatic vinyl monomer units and conjugated diene monomer units, when the block copolymers are subjected to ozone decomposition and then to reduction by lithium aluminum hydride according to the method described in Rubber Chem. Technol., 45, 1295 (1972), the conjugated diene monomer unit moieties are decomposed and only the aromatic vinyl monomer unit moieties can be extracted. Therefore, the overall content of aromatic vinyl monomer units can be measured easily.

Furthermore, the overall weight average molecular weight of the block copolymer composition comprising the block copolymer A, the block copolymer B, and the block copolymer other than the block copolymer A and the block copolymer B that can be optionally incorporated, is not particularly limited, but the overall weight average molecular weight is usually 94,000 to 200,000, preferably 100,000 to 185,000, and more preferably 105,000 to 175,000. Furthermore, the molecular weight distribution expressed as the ratio (Mw/Mn) between the weight average molecular weight (Mw) and the number average molecular weight (Mn) of the entirety of this block copolymer composition is not particularly limited, but the molecular weight distribution is usually 1.01 to 10, preferably 1.02 to 5, and more preferably 1.03 to 3.

There are no particular limitations on the method for obtaining the block copolymer composition of the present invention. For example, the block copolymer composition can be produced by separately producing each of the block copolymers according to a conventional polymerization method, and mixing those block copolymers by a conventional method such as kneading or solution mixing. However, from the viewpoint of obtaining the block copolymer composition with high productivity, the production method described below is suitable.

That is, the block copolymer composition comprising the block copolymer A and the block copolymer B used in the present invention is preferably produced using a production method including the following steps (1) to (5).

(1): A step of polymerizing an aromatic vinyl monomer in a solvent using a polymerization initiator.

(2): A step of adding a conjugated diene monomer to the solution containing an aromatic vinyl polymer having an active terminal as obtained in the above step (1).

(3): A step of adding a polymerization terminator to the solution containing an aromatic vinyl-conjugated diene block copolymer having an active terminal as obtained in the above step (2), such that the amount of the polymerization terminator would be less than 1 molar equivalent with respect to the active terminal of the aromatic vinyl-conjugated diene block copolymer having an active terminal, and forming a block copolymer B.

(4): A step of adding an aromatic vinyl monomer to the solution obtained in the above step (3), and forming a block copolymer A.

(5): A step of collecting polymer components from the solution obtained in the above step (4).

In the production method described above, first, an aromatic vinyl monomer is polymerized in a solvent using a polymerization initiator (Step (1)). Regarding the polymerization initiator that may be used, an organic alkali metal compound, an organic alkaline earth metal compound, an organic lanthanoid-based rare earth metal compound and the like, which are generally known to have anionic polymerization activity for aromatic vinyl monomers and conjugated diene monomers, can be used. For the organic alkali metal compound, an organolithium compound having one or more lithium atoms in the molecule is particularly suitably used, and specific examples thereof include organic monolithium compounds such as ethyllithium, n-propyllithium, isopropyllithium, n-butyllithium, sec-butyllithium, t-butyllithium, hexyllithium, phenyllithium, stilbene lithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithioethylcyclohexane; and organic trilithium compounds such as 1,3,5-trilithiobenzene. Among these, organic monolithium compounds are particularly suitably used.

Examples of the organic alkaline earth metal compound that is used as a polymerization initiator include n-butylmagnesium bromide, n-hexylmagnesium bromide, ethcxycalcium, calcium stearate, t-butoxystrontium, ethoxybarium, isopropoxybarium, ethylmercaptobarium, t-butoxybarium, phenoxybarium, diethylaminobarium, barium stearate, and ethylbarium. Furthermore, specific examples of other polymerization initiators include compounds that form a uniform system in organic solvent and have living polymerizability, such as composite catalysts formed from lanthanoid-based rare earth metal compounds including neodymium, samarium and gadolinium/alkylaluminum/alkylaluminum halide/alkylaluminum hydride; and metallocene type catalysts including titanium, vanadium, samarium, and gadolinium. Incidentally, these polymerization initiators may be used singly, or two or more kinds thereof may be used in mixture.

The amount of use of the polymerization initiator may be determined in accordance with the molecular weights of the various intended block copolymers and are not particularly limited. However, the amount of use is usually 0.01 millimole to 20 millimoles, preferably 0.05 millimole to 15 millimoles, and more preferably 0.1 millimole to 10 millimoles, per 100 g of all the monomers used.

The solvent used for the polymerization is not particularly limited as long as it is inert to the polymerization initiator, and for example, chain-like hydrocarbon solvents, cyclic hydrocarbon solvents, or solvent mixtures thereof are used. Examples of the chain-like hydrocarbon solvents include chain-like alkanes and alkenes having 4 to 6 carbon atoms, such as n-butane, isobutane, 1-butene, isobutylene, trans-2-butene, cis-2-butene, 1-pentene, trans-2-pentene, cis-2-pentene, n-pentane, isopentane, neopentane, and n-hexane. Specific examples of the cyclic hydrocarbon solvents include aromatic compounds such as benzene, toluene, and xylene; and alicyclic hydrocarbon compounds such as cyclopentane and cyclohexane. These solvents may be used singly, or two or more kinds thereof may be used in mixture.

The amount of the solvent used for polymerization is not particularly limited, but the amount is set such that the total concentration of the block copolymers in the solution obtainable after the polymerization reaction would be usually 5% to 60% by weight, preferably 10% to 55% by weight, and more preferably 20% to 50% by weight.

In order to control the structures of the various polymer blocks of the various block copolymers, a Lewis base compound may be added to the reactor. Examples of this Lewis base compound include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyl oxide and potassium t-butyl oxide; and phosphines such as triphenylphosphine. These Lewis base compounds are used singly or in combination of two or more kinds thereof, and are appropriately selected to the extent that the purposes of the present invention are not impaired.

Furthermore, the timing for adding the Lewis base compound at the time of the polymerization reaction is not particularly limited, and may be appropriately determined in accordance with the intended structures of the various block copolymers. For example, the Lewis base compound may be added in advance before polymerization is initiated, may be added after a portion of the polymer blocks have been polymerized, or may be added in advance before polymerization is initiated and then further added after a portion of the polymer blocks have been polymerized.

The polymerization reaction temperature is usually 10° C. to 150° C., preferably 30° C. to 130° C., and more preferably 40° C. to 90° C. The time required for polymerization may vary with the conditions, but the time for the polymerization reaction is usually 48 hours or less, and preferably 0.5 hour to 10 hours. The polymerization pressure is not particularly limited, and polymerization may be carried out in a pressure range sufficient for maintaining the monomers and the solvent in a liquid state in the polymerization temperature range mentioned above.

When an aromatic vinyl monomer is polymerized in a solvent using a polymerization initiator under the conditions such as described above, a solution containing an aromatic vinyl polymer having an active terminal can be obtained. This aromatic vinyl polymer having an active terminal constitutes the aromatic vinyl polymer block having a relatively smaller weight average molecular weight ($Ar1^a$) of the block copolymer A, and the aromatic vinyl polymer block ($Ar^b$) of the aromatic vinyl polymer block of the block copolymer B. Therefore, the amount of the aromatic vinyl monomer used at this time is determined depending on the intended weight average molecular weights of these polymer blocks.

The next step is a step of adding a conjugated diene monomer to the solution containing an aromatic vinyl polymer having an active terminal that is obtained as described above (Step (2)). Through this addition of a conjugated diene monomer, a conjugated diene polymer chain is formed from the active terminal, and thus a solution containing an aromatic vinyl-conjugated diene block copolymer having an active terminal is obtained. The amount of the conjugated diene monomer used at this time is determined such that the resulting conjugated diene polymer chain would have the intended weight average molecular weights of the conjugated diene polymer block ($D^a$) of the block copolymer A and the conjugated diene block ($D^b$) of the block copolymer B.

In the subsequent step, a polymerization terminator is added to the solution containing an aromatic vinyl-conjugated diene block copolymer having an active terminal that is obtained as described above, such that the amount of the polymerization terminator would be less than 1 molar equivalent with respect to the active terminal of the aromatic vinyl-conjugated diene block copolymer having an active terminal (Step (3)). When a polymerization terminator is added to the solution containing an aromatic vinyl-conjugated diene block copolymer having an active terminal, the active terminal of the aromatic vinyl-conjugated diene block copolymer having an active terminal is deactivated, and as a result, the block copolymer B, which is an aromatic vinyl-conjugated diene diblock copolymer, is formed.

There are no particular limitations on the polymerization terminator that is added in this step, and any conventionally known polymerization terminator can be used without any particular limitations. Examples of polymerization terminators that are particularly suitably used include alcohols such as methanol, ethanol, propanol, butanol, and isopropanol.

The amount of the polymerization terminator that is added in this step needs to be adjusted to an amount of less than 1 molar equivalent with respect to the active terminal of the aromatic vinyl-conjugated diene block copolymer having an active terminal. It is because in order to carry out the process for forming the block copolymer A, which is a subsequent step, it is necessary to cause the aromatic vinyl-conjugated diene block copolymer having an active terminal to remain in the solution. The amount of the polymerization terminator is preferably 0.10 molar equivalents to 0.90 molar equivalents, and more preferably 0.15 molar equivalents to 0.70 molar equivalents, with respect to the active terminal of the polymer. Incidentally, since the amount of the polymerization terminator that is added in this step determines the amount of the block copolymer B, the amount of the polymerization terminator may be determined according to the intended composition of the block copolymer composition.

There are no particular limitations on the reaction conditions for the polymerization termination reaction, and usually, the reaction conditions may be set up to the same extent as the polymerization reaction conditions described above.

In the subsequent step, an aromatic vinyl monomer is added to the solution that is obtained as described above (Step (4)). When an aromatic vinyl monomer is added to the solution, an aromatic vinyl polymer chain is formed from the terminal of the aromatic vinyl-conjugated diene block copolymer having an active terminal that remained without reacting with the polymerization terminator. This aromatic vinyl polymer chain constitutes the aromatic vinyl polymer block having a relatively larger weight average molecular weight ($Ar2^a$) of the block copolymer A. Therefore, the amount of the aromatic vinyl monomer used at this time is determined in accordance with the intended weight average molecular weight of the aromatic vinyl polymer block ($Ar2^a$). Through this process for adding an aromatic vinyl monomer, an asymmetric aromatic vinyl-conjugated diene-aromatic vinyl triblock copolymer that constitutes the block copolymer A is formed, and as a result, a solution containing the block copolymer A and the block copolymer B is obtained. Incidentally, a conjugated diene monomer may be added to the solution containing an aromatic vinyl-conjugated diene block copolymer having an active terminal that did not react with the polymerization terminator, before this step of adding an aromatic vinyl monomer. As such, when a conjugated diene monomer is added, the weight average molecular weight of the conjugated diene polymer block ($D^a$) of the block copolymer A can be made larger compared to the case of not adding the conjugated diene monomer.

In the subsequent step, the intended polymer components (block copolymer composition) are collected from the solution that is obtained as described above (Step (5)). The method for collection may be carried out according to a conventional method, and there are no particular limitations. For example, the polymer components can be collected by adding, if necessary, a polymerization terminator such as water, methanol, ethanol, propanol, hydrochloric acid or citric acid after completion of the reaction, further adding additives such as an antioxidant as necessary, and applying a known method such as a direct drying method or steam stripping to the solution. When the polymer components are collected as slurry by applying steam stripping or the like, the polymer components are dehydrated using an arbitrary dehydrator such as an extruder type squeezer to obtain a crumb having a water content of a predetermined value or less, and the crumb may be dried using an arbitrary dryer such as a band dryer or an expansion extrusion dryer. The block copolymer composition obtained as described above may be processed into pellets and the like according to a conventional method, and then may be supplied to the production of a hot melt adhesive composition or the like.

According to the production method described above, since the block copolymer A and the block copolymer B can be continuously obtained in the same reaction vessel, an intended block copolymer composition can be obtained with extremely excellent productivity as compared with the case of individually producing the respective polymers and mixing them.

The block copolymer composition of the present invention is used to constitute a hot melt adhesive. On the occasion of constituting a hot melt adhesive using the block copolymer composition of the present invention, there are no particular limitations on the components to be incorporated other than the block copolymer composition, but usually, at least a tackifying resin is used. Furthermore, since the block copolymer composition of the present invention has a feature that the block copolymer composition can produce a hot melt adhesive having excellent softening agent holding properties, the block copolymer composition is suitably used in the case of forming a hot melt adhesive by incorporating a relatively large amount of a softening agent. That is, the hot melt adhesive composition of the present invention, which is suitable as a hot melt adhesive composition formed by using the block copolymer composition of the present invention, is configured to include 100 parts by weight of the block copolymer composition for a hot melt adhesive of the present invention, 30 parts to 800 parts by weight of a tackifying resin, and 10 parts to 500 parts by weight of a softening agent.

Regarding the tackifying resin that is used in the present invention, a conventionally known tackifying resin can be used. Specific examples include rosin; modified rosins such as disproportionate rosin and dimerized rosin; esterification products between polyhydric alcohols such as glycol, glycerin and pentaerythritol, and rosin or modified rosins; terpene-based resins; aliphatic, aromatic, alicyclic, or aliphatic-aromatic copolymer-based hydrocarbon resins or hydrides thereof; phenolic resins; and coumarone-indene resins. A tackifying resin that is particularly preferably used is an aliphatic or aliphatic-aromatic copolymer-based hydrocarbon resin having favorable compatibility with the polymer components used in the present invention. The content of the tackifying resin in the hot melt adhesive composition of the present invention is 30 parts to 800 parts by weight, preferably 50 parts to 500 parts by weight, and more preferably 60 parts to 300 parts by weight, per 100 parts by weight of the block copolymer composition. Incidentally, the tackifying resins may be used singly, or two or more kinds thereof may be used in combination.

The softening agent used in the present invention is not particularly limited, but an organic compound that is liquid at room temperature (23° C.) is suitably used. The kind of the softening agent is not particularly limited as long as the softening agent exhibits compatibility with the block copolymer composition, and specifically, those aromatic, paraffinic or naphthene-based process oils; liquid polymers such as polybutene and polyisobutylene; and the like, which are added to conventional hot melt adhesive compositions, can be used. Among these, paraffinic process oils or naphthene-based process oils are particularly suitable. Incidentally, the softening agents may be used singly, or two or more kinds thereof may be used in combination.

The content of the softening agent in the hot melt adhesive composition of the present invention is 10 parts to 500 parts by weight, preferably 20 parts to 400 parts by weight, and more preferably 30 parts to 300 parts by weight, per 100 parts by weight of the block copolymer composition. Since the hot melt adhesive composition of the present invention has excellent softening agent holding properties, a relatively large amount of the softening agent can be incorporated, and when the softening agent is incorporated in such an amount, the hot melt adhesive composition can be made easily applicable at a relatively low temperature, and can have excellent tackiness in a low temperature environment.

The hot melt adhesive composition of the present invention may contain a polymer other than the essential components such as those described above. Examples of such a polymer include, but are not limited to, conjugated diene homopolymers such as polybutadiene and polyisoprene; aromatic vinyl-conjugated diene random copolymers such as a (styrene-butadiene) random copolymer and a (styrene-isoprene) random copolymer; aromatic vinyl homopolymers such as polystyrene; and polymers having elasticity at room temperature (23° C.), such as isobutyrene-based polymers, acrylic polymers, ester-based polymers, ether-based polymers, urethane-based polymers, and polyvinyl chloride. In regard to the hot melt adhesive composition of the present invention, the content of such a polymer is preferably 20% by weight or less, and more preferably 10% by weight or less, relative to the weight of the block copolymer composition.

Furthermore, if necessary, an antioxidant can be added to the hot melt adhesive composition of the present invention. There are no particular limitations on the kind thereof, and examples that can be used include hindered phenolic compounds such as pentaerythritol tetrakis[3-(3,5-di-t-butyl-4-hydroxyphenyl) propionate], octadecyl-3-(3,5-di-t-butyl-4-hydroxypenyl) propionate, 2,6-di-t-butyl-p-cresol, and di-t-butyl-4-methylphenol; thiodicarboxylate esters such as dilauryl thiopropionate; and phosphites such as tris(nonylphenyl)phosphate. The amount of use of the antioxidant is not particularly limited, but the amount of use is usually 10 parts by weight or less, and preferably 0.5 part to 5 parts by weight, per 100 parts by weight of the block copolymer composition. Incidentally, the antioxidants may be used singly, or two or more kinds thereof may be used in combination.

Furthermore, in the hot melt adhesive composition of the present invention, other mixing agents such as a wax, a thermal stabilizer, an ultraviolet absorber, and a filler can be further added. Incidentally, the hot melt adhesive composition of the present invention is preferably a solventless composition that does not include any solvent.

On the occasion of obtaining the hot melt adhesive composition of the present invention, there are no particular limitations on the method of mixing the block copolymer composition with other components, and examples include a method of dissolving the respective components in a solvent, uniformly mixing the solutions, and removing the solvent by heating or the like; and a method of melt mixing the various components with a kneader or the like. From the viewpoint of performing mixing more efficiently, melt mixing is suitable among these methods. Incidentally, the temperature at the time of performing melt mixing is not particularly limited, but the temperature is usually in the range of 100° C. to 200° C.

The applications (object to be adhered) of the hot melt adhesive composition of the present invention is not particularly limited, and can be used for various adhesions to which hot melt adhesion is applicable; however, among them, the hot melt adhesive composition is particularly suitably used as an adhesive for labels. For example, the hot melt adhesive composition of the present invention is melted by heating, subsequently cut with a die to a constant size, subsequently applied on a paper substrate such as high quality paper, art paper, cast paper, thermal paper or foil paper; and a film substrate such as a synthetic resin film of polyethylene terephthalate, or a Cellophane film, or applied on a release paper, and then transferred to a substrate. Thus, a label is produced. Since the hot melt adhesive composition of the present invention has satisfactory softening agent holding properties or die-cutting performance, the hot melt adhesive composition contributes to a reduction of defective product ratio and to an increase in productivity in the production of such a label. Furthermore, the label thus obtainable has excellent holding power as an adhesive or excellent tackiness in a low temperature environment. The applications of the labels thus obtainable are not particularly limited, but for example, the labels can be used as product labels for the container packaging of foods, beverages and alcoholic beverages, or as variable information labels. The labels can also be used as labels for logistics, electrical/precision instruments, pharmaceutics/medicine, cosmetics/toiletries, stationeries/office appliances, and automobiles.

EXAMPLES

Hereinafter, the present invention will be more specifically described by way of Examples and Comparative Examples. Incidentally, unless particularly stated otherwise, parts and percentage (%) in the various Examples are on a mass basis.

Various measurements were carried out by the following methods.

[Weight Average Molecular Weight]

The weight average molecular weight was determined as a molecular weight calculated relative to polystyrene standards, by high performance liquid chromatography using tetrahydrofuran as a carrier at a flow rate of 0.35 ml/min. The measurement was carried out using an HLC8220™ manufactured by Tosoh Corp. as an apparatus, with three connected columns of SHODEX KE-404HQ™ manufactured by Showa Denko K.K. (column temperature 40° C.), and a differential refractometer and an ultraviolet detector as detectors, and using twelve samples of polystyrene standards (from 500 to 3,000,000) manufactured by Polymer Laboratories, Ltd. for the calibration of the molecular weight.

[Weight Ratio of Various Block Copolymers in Block Copolymer Composition]

The weight ratio was determined from the area ratio of peaks corresponding to the various block copolymers in the charts obtained by high performance liquid chromatography as described above.

[Weight Average Molecular Weight of Styrene Polymer Block of Block Copolymer]

A block copolymer was caused to react with ozone according to the method described in Rubber Chem. Technol., 45, 1295 (1972), and was reduced using lithium aluminum hydride, and thereby an isoprene polymer block of the block copolymer was decomposed. Specifically, the process was carried out by the following procedure. That is, 300 mg of a sample was dissolved in a reaction vessel containing 100 ml of dichloromethane that had been treated with a molecular sieve. This reaction vessel was placed in a cooling tank, and from −25° C., ozone generated by an ozone generator was introduced into the reaction vessel while oxygen was allowed to flow thereinto at a flow rate of 170 ml/min. After 30 minutes from the initiation of the reaction, it was checked whether the reaction had ended by introducing the gas discharged out from the reaction vessel into an aqueous solution of potassium iodide. Subsequently, 50 ml of diethyl ether and 470 mg of lithium aluminum hydride were introduced into another reaction vessel that had been purged with nitrogen, and while the reaction vessel was cooled with ice water, the solution that had reacted with ozone was slowly added dropwise to this reaction vessel. Then, the reaction vessel was placed in a water bath to raise the temperature slowly, and the reaction solution was refluxed at 40° C. for 30 minutes. Thereafter, dilute hydrochloric acid was added dropwise in small amounts while the solution was stirred, and dropwise addition was continued until generation of hydrogen was almost not recognized. After this reaction, the solid product generated in the solution was separated by filtration, and the solid product was extracted with 100 ml of diethyl ether for 10 minutes. This extract was combined with the filtrate obtained at the time of separation by filtration, and the solvent was distilled off. Thus, a solid sample was obtained. For the sample obtained as such, the weight average molecular weight was measured according to the method for measuring the weight average molecular weight described above, and the value was designated as the weight average molecular weight of the styrene polymer block.

[Weight Average Molecular Weight of Isoprene Polymer Block of Block Copolymer]

The weight average molecular weight of the corresponding styrene polymer block was subtracted from the weight average molecular weight of each block copolymer determined as described above, and the weight average molecular weight of the isoprene polymer block was determined based on the calculation value.

[Styrene Unit Content of Block Copolymer]

The styrene unit content was determined based on the ratio between the detection intensities of a differential refractometer and an ultraviolet detector in the analysis by high performance liquid chromatography described above. Incidentally, copolymers having different styrene unit contents were prepared, and a calibration curve was produced using those.

[Styrene Unit Content of Block Copolymer Composition (Overall)]

The styrene unit content was determined based on a proton NMR analysis.

[Vinyl Bond Content of Isoprene Polymer Block]

The vinyl bond content was determined based on a proton NMR analysis.

[Tackiness in Low Temperature Environment of Hot Melt Adhesive Composition]

The loop tack in an atmosphere at 5° C. was measured according to FINAT-1991 FTM-9 (Quick-stick tack measurement), and thus tackiness was evaluated. A larger value indicates superior tackiness in a low temperature environment.

[Adhesion Level of Hot Melt Adhesive Composition]

The adhesion level was evaluated by measuring the peeing adhesive strength (N/m) at normal temperature according to PSTC-1 (180° peeling adhesion test defined by the American Pressure-Sensitive Tape Council) at 23° C. using a hard polyethylene plate as a body to be adhered. A larger value indicates superior adhesion level.

[Holding Power of Hot Melt Adhesive Composition]

A sample was produced into an adhesive tape having a width of 10 mm, a hard polyethylene was used as a body to be adhered, and thereby holding power was evaluated according to PSTC-6 (a holding power testing method defined by the American Pressure-Sensitive Tape Council), based on the time (minutes) taken until an adhesion section having a size of 10×25 mm was detached at a temperature of 40° C. under a load of $3.92 \times 10^4$ Pa. A larger value indicates superior holding power.

[Shear Adhesion Failure Temperature (SAFT) of Hot Melt Adhesive Composition]

The shear adhesion failure temperature (SAFT) was measured using stainless steel as a body to be measured, using an adhesion section having a size of 10×25 mm under a load of $3.92 \times 10^4$ Pa and a rate of temperature increase of 0.5° C./min. A larger value indicates superior heat resistance.

[Softening Agent Holding Properties of Hot Melt Adhesive Composition]

A hot melt adhesive composition that served as a sample was pasted as an adhesive tape on high quality paper, and then the paper was cut to a size of 50×50 mm. This adhesive tape was inserted between A4-sized glass plates, and such plural glass plates were stacked, and thereby the load was adjusted to be 2 kg. Subsequently, the glass plate was left to stand for 72 hours in air at 80° C., and was thereby subjected to aging. For this sample, the brightness (L) values at the high quality paper surface before and after the aging were measured, and the value (%) of L(before aging)/L(after aging)×100 was calculated. As this value is larger, the hot melt adhesive composition has superior softening agent holding properties. Incidentally, the brightness measurement was carried out by a reflection method using an "S & M Colour Computer Model SM-7™" manufactured by Suga Test Instruments Co., Ltd.

[Transparency of Hot Melt Adhesive Composition]

A hot melt adhesive composition that was used as a sample was dissolved in dehydrated toluene, and thus a 25% solution was obtained. For this solution, the visible light transmittance was measured using a "Hitachi Spectrophotometer U-3010™" manufactured by Hitachi High-Technologies Corp. as an analyzer, and using a 10-mm quartz cell as a cell. A larger value of this visible light transmittance indicates superior transparency.

Production Example 1

In a pressure-resistant reactor, 23.3 kg of cyclohexane, 3.7 millimoles of N,N,N',N'-tetramethylethylenediamine (hereinafter, referred to as TMEDA), and 2.2 kg of styrene were introduced, and while the content was stirred at 40° C., 123 millimoles of n-butyllithium was added thereto. Polymerization was carried out for one hour while the temperature was increased to 50° C. The polymerization conversion ratio of styrene was 100%. Subsequently, 7.2 kg of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Next, 91.1 millimoles of methanol was added thereto as a polymerization terminator, the mixture was allowed to react for one hour, and a portion of the active terminals of a styrene-isoprene block copolymer having an active terminal was deactivated. Thus, a styrene-isoprene diblock copolymer that served as a block copolymer B, was formed. Thereafter, 0.7 kg of styrene was continuously added thereto over one hour while the temperature was controlled to be maintained at 50° C. to 60° C. After the addition of styrene was completed, polymerization was carried out for another one hour, and thus a styrene-isoprene-styrene triblock copolymer that served as a block copolymer A was formed. The polymerization conversion ratio of styrene was 100%. Thereafter, 246 millimoles of methanol as a polymerization terminator was added thereto and mixed thoroughly therein to terminate the reaction. Incidentally, the amounts of the various reagents used in the reaction are summarized in Table 1. To 100 parts of the reaction liquid obtained as described above (including 30 parts of polymer components), 0.3 part of 2,6-di-t-butyl-p-cresol was added and mixed as an antioxidant, and the mixed solution was added dropwise in small amounts to hot water that had been heated to 85° C. to 95° C. to thereby volatilize the solvent, and thus a separating material was obtained. This separating material was pulverized and dried in hot air at 85° C., and thus a composition of Production Example 1 was collected. A portion of the reaction liquid thus obtained was taken, and the weight average molecular weights of the various block copolymers comprised in the composition, the weight ratio of the various block copolymers in the composition, the weight average molecular weights of the styrene polymer blocks of the various block copolymers, the weight average molecular weights of the isoprene polymer blocks of the various block copolymers, the styrene unit contents of the various block copolymers, the styrene unit content of the block copolymer composition (overall), the vinyl bond contents of the isoprene polymer blocks of the various block copolymers, the difference between the weight average molecular weights of the two styrene polymer blocks in the block copolymer A, and the ratio of the weight average molecular weight of the block copolymer A with respect to the weight average molecular weight of the block copolymer B were determined. These values are presented in Table 2.

TABLE 1

|  | Production Example | | | | | | Comparative Production Example | | | |
| --- | --- | --- | --- | --- | --- | --- | --- | --- | --- | --- |
|  | 1 | 2 | 3 | 4 | 5 | 6 | 1 | 2 | 3 | 4 |
| Cyclohexane (kg) | 23.3 | 23.3 | 23.3 | 23.3 | 23.3 | 23.3 | 23.3 | 23.3 | 23.3 | 23.3 |
| TMEDA (millimoles) | 3.7 | 3.7 | 3.2 | 3.7 | 2.8 | 2.6 | 2.5 | 4.8 | 2.8 | 2.7 |
| n-butyllithium (millimoles) | 123 | 122 | 106 | 124 | 93 | 86 | 84 | 161 | 93 | 88 |
| Styrene (kg) [Polymerization stage 1] | 2.2 | 1.5 | 1.7 | 1.9 | 1.5 | 1.35 | 1.1 | 2.0 | 1.1 | 1.5 |
| Isoprene (kg) [Polymerization stage 2] | 7.2 | 7.4 | 7.5 | 6.2 | 5.5 | 7.1 | 7.5 | 8.0 | 7.0 | 5.1 |
| Methanol (millimoles) [After polymerization stage 2] | 91.1 | 59.8 | 74.5 | 39.6 | — | — | 55.5 | — | 56.7 | 46.8 |
| Dimethyldichlorosilane (millimoles) [After polymerization stage 2] | — | — | — | — | — | — | — | 26.6 | — | — |
| Styrene (kg) [Polymerization stage 3] | 0.7 | 1.1 | 0.9 | 1.9 | 3.4 | — | 1.4 | — | 1.9 | 3.4 |
| Methanol (millimoles) [At end of polymerization] | 246 | 244 | 213 | 248 | 186 | 172 | 168 | 323 | 186 | 177 |

TABLE 2

| | Production Example | | | | | | Comparative Production Example | | | |
|---|---|---|---|---|---|---|---|---|---|---|
| | 1 | 2 | 3 | 4 | 5 | 6 | 1 | 2 | 3 | 4 |
| Styrene-isoprene-styrene triblock copolymer (block copolymer A) | | | | | | | | | | |
| Weight average molecular weight of styrene block (Ar1$^a$) [Mw(Ar1$^a$)] | 17000 | 13000 | 16000 | 15500 | 16500 | — | 12700 | 13000 | 11500 | 18000 |
| Weight average molecular weight of styrene block (Ar2$^a$) [Mw(Ar2$^a$)] | 30000 | 21000 | 36000 | 27000 | 24900 | — | 47100 | 13000 | 61400 | 100000 |
| Mw(Ar2$^a$) − Mw(Ar1$^a$) | 13000 | 8000 | 20000 | 11500 | 8400 | — | 34400 | 0 | 49900 | 82000 |
| Weight average molecular weight of isoprene block (D$^a$) [Mw(D$^a$)] | 96000 | 97000 | 113000 | 82000 | 95600 | — | 123200 | 180000 | 117300 | 95000 |
| Vinyl bond content of isoprene block (D$^a$) (mol %) | 7 | 7 | 7 | 7 | 7 | — | 7 | 7 | 7 | 7 |
| Weight average molecular weight [MwA] | 143000 | 131000 | 165000 | 124500 | 137000 | — | 183000 | 206000 | 190200 | 213000 |
| Styrene unit content (%) | 38 | 35 | 40 | 44 | 40 | — | 39 | 20 | 49 | 65 |
| Styrene-isoprene diblock copolymer (block copolymer B) | | | | | | | | | | |
| Weight average molecular weight of styrene block [Mw(Ar$^b$)] | 17000 | 13000 | 16000 | 15500 | — | 17000 | 12700 | 13000 | 11500 | 18000 |
| Weight average molecular weight of isoprene block [Mw(D$^b$)] | 96000 | 97000 | 113000 | 82000 | — | 127000 | 123200 | 90000 | 117300 | 95000 |
| Vinyl bond content of isoprene block (mol %) | 7 | 7 | 7 | 7 | — | 7 | 7 | 7 | 7 | 7 |
| Weight average molecular weight [MwB] | 113000 | 110000 | 129000 | 97500 | — | 144000 | 135900 | 103000 | 128800 | 113000 |
| Styrene unit content (%) | 22 | 17 | 18 | 23 | — | 16 | 12 | 20 | 13 | 23 |
| Overall block copolymer composition | | | | | Production Example 5 + Production Example 6 (Example 5) | | | | | |
| MwA/MwB | 1.26 | 1.19 | 1.28 | 1.28 | 0.95 | | 1.34 | 2.00 | 1.48 | 1.89 |
| Weight average molecular weight | 120500 | 120000 | 140000 | 116000 | 140500 | | 157000 | 137000 | 159000 | 173000 |
| Styrene unit content (%) | 26 | 26 | 25 | 38 | 28 | | 25 | 20 | 30 | 48 |
| Block copolymer A/block copolymer B (weight ratio) | 25/75 | 50/50 | 30/70 | 69/31 | 50/50 | | 44/56 | 33/67 | 49/51 | 60/40 |

Production Examples 2 to 4

Compositions of Production Examples 2 to 4 were collected in the same manner as in Production Example 1, except that the amounts of styrene, n-butyllithium, TMEDA, isoprene and methanol were changed respectively as indicated in Table 1. For these compositions, the same measurements as in Production Example 1 were carried out. The results are presented in Table 2.

Production Example 5

In a pressure-resistant reactor, 23.3 kg of cyclohexane, 2.8 millimoles of TMEDA, and 1.5 kg of styrene were introduced, and while the content was stirred at 40° C., 93 millimoles of n-butyllithium was added thereto. Polymerization was carried out for one hour while the temperature was increased to 50° C. The polymerization conversion ratio of styrene was 100%. Subsequently, 5.5 kg of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Furthermore, 3.4 kg of styrene was continuously added thereto over one hour while the temperature was controlled to be maintained at 50° C. to 60° C. After the addition of styrene was completed, polymerization was carried out for another one hour, and thus a styrene-isoprene-styrene triblock copolymer was formed. The polymerization conversion ratio of styrene was 100%. Thereafter, 186 millimoles of methanol as a polymerization terminator was added thereto and mixed thoroughly therein to terminate the reaction. Incidentally, the amounts of the various reagents used in the reaction are summarized in Table 1. The reaction liquid obtained as described above was treated in the same manner as in Production Example 1, and thus a composition of Production Example 5 (block copolymer) was collected. Also, a portion of the reaction liquid thus obtained was taken, and the same measurements as in Production Example 1 were carried out. These measurement values are presented in Table 2.

Production Example 6

In a pressure-resistant reactor, 23.3 kg of cyclohexane, 2.6 millimoles of TMEDA, and 1.35 kg of styrene were introduced, and while the content was stirred at 40° C., 86 millimoles of n-butyllithium was added thereto. Polymerization was carried out for one hour while the temperature was increased to 50° C. The polymerization conversion ratio of styrene was 100%. Subsequently, 7.1 kg of isoprene was continuously added to the reactor over one hour while the temperature was controlled to be maintained at 50° C. to 60° C. After the addition of isoprene was completed, polymerization was carried out for another one hour, and thus a styrene-isoprene block copolymer was formed. The polymerization conversion ratio of isoprene was 100%. Thereafter, 172 millimoles of methanol as a polymerization terminator was added thereto and mixed thoroughly therein, and thus the reaction was terminated. Incidentally, the amounts of the various reagents used in the reaction are summarized in Table 1. The reaction liquid obtained as described above was treated in the same manner as in Production Example 1, and thus a composition of Production Example 6 (block copolymer) was collected. Furthermore, a portion of the reaction liquid thus obtained was taken, and the same measurements as in Production Example 1 were carried out. These measurement values are presented in Table 2.

Comparative Production Examples 1, 3 and 4

Compositions of Comparative Production Examples 1, 3 and 4 were collected in the same manner as in Production Example 1, except that the amounts of styrene, n-butyllithium, TMEDA, isoprene, and methanol were changed respectively as indicated in Table 1. For these compositions, the same measurements as in Production Example 1 were carried out. The results are presented in Table 2.

Comparative Production Example 2

In a pressure-resistant reactor, 23.3 kg of cyclohexane, 4.8 millimoles of TMEDA, and 2.0 kg of styrene were introduced, and while the content was stirred at 40° C., 161 millimoles of n-butyllithium was added thereto. Polymerization was carried out for one hour while the temperature was increased to 50° C. The polymerization conversion ratio of styrene was 100%. Subsequently, 8.0 kg of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Subsequently, 26.6 millimoles of dimethyldichlorosilane was added as a coupling agent, and the mixture was allowed to react for 2 hours by controlling the temperature to be maintained at 50° C. to 60° C. to cause a portion of the styrene-isoprene block copolymer having an active terminal to be coupled. Thus, a styrene-isoprene-styrene triblock copolymer having a substantially symmetric structure was formed. Thereafter, 323 millimoles of methanol as a polymerization terminator was added thereto and mixed thoroughly therein, and thus the reaction was terminated. Incidentally, the amounts of the various reagents used in the reaction are summarized in Table 1. The reaction liquid obtained as described above was treated in the same manner as in Production Example 1, and thus a composition of Comparative Production Example 2 (block copolymer) was collected. Furthermore, a portion of the reaction liquid thus obtained was taken, and the same measurements as in Production Example 1 were carried out. These measurement values are presented in Table 2.

Example 1

Introduced was 100 parts of the composition obtained in Production Example 1 into a stirring blade type kneading machine, and 150 parts of a tackifying resin (trade name: "QUINTONE R100", aliphatic hydrocarbon resin, manufactured by Zeon Corp.), 50 parts of a naphthene-based process oil (trade name "DIANA PROCESS OIL NS-90S", manufactured by Idemitsu Kosan Co., Ltd.), and 1.5 parts of an antioxidant (trade name "IRGANOX 1076", octadecyl-3-(3,5-di-t-butyl-4-hydroxyphenyl) propionate, manufactured by Ciba Specialty Chemicals, Inc.) were added thereto. The interior of the system was purged with nitrogen gas, and then the mixture was kneaded for one hour at 160° C. to 180° C. Thus, a hot melt adhesive composition of Example 1 was produced. Then, the hot melt adhesive composition thus obtained was applied on a polyester film having a thickness of 55 μm, and for the sample thus obtained, loop tack (tackiness in a low temperature environment), peeling adhesion level, holding power, shear adhesion failure temperature (heat resistance), softening agent holding properties, and transparency were evaluated. These results are presented in Table 3.

TABLE 3

|  | Example |  |  |  |  | Comparative Example |  |  |  |  |
| --- | --- | --- | --- | --- | --- | --- | --- | --- | --- | --- |
| Block copolymer composition used | 1 Production Example 1 | 2 Production Example 2 | 3 Production Example 3 | 4 Production Example 4 | 5 Production Example 5 + Production Example 6 | 1 Comparative Production Example 1 | 2 Comparative Production Example 2 | 3 Comparative Production Example 3 | 4 Comparative Production Example 4 | 5 Production Example 5 |
| Styrene-isoprene-styrene triblock copolymer (block copolymer A) |  |  |  |  |  |  |  |  |  |  |
| Weight average molecular weight of styrene block (Ar1$^a$) [Mw(Ar1$^a$)] | 17000 | 13000 | 16000 | 15500 | 16500 | 12700 | 13000 | 11500 | 18000 | 16500 |
| Weight average molecular weight of styrene block (Ar2$^a$) [Mw(Ar2$^a$)] | 30000 | 21000 | 36000 | 27000 | 24900 | 47100 | 13000 | 61400 | 100000 | 24900 |
| Mw(Ar2$^a$) − Mw(Ar1$^a$) | 13000 | 8000 | 20000 | 11500 | 8400 | 34400 | 0 | 49900 | 82000 | 8400 |
| Weight average molecular weight of isoprene block (D$^a$) [Mw(D$^a$)] | 96000 | 97000 | 113000 | 82000 | 95600 | 123200 | 180000 | 117300 | 95000 | 95600 |
| Weight average molecular weight [MwA] | 143000 | 131000 | 165000 | 124500 | 137000 | 183000 | 206000 | 190200 | 213000 | 137000 |
| Styrene unit content (%) | 38 | 35 | 40 | 44 | 40 | 39 | 20 | 49 | 65 | 40 |

TABLE 3-continued

| Block copolymer composition used | Example 1 Production Example 1 | Example 2 Production Example 2 | Example 3 Production Example 3 | Example 4 Production Example 4 | Example 5 Production Example 5 + Production Example 6 | Comparative 1 Comparative Production Example 1 | Comparative 2 Comparative Production Example 2 | Comparative 3 Comparative Production Example 3 | Comparative 4 Comparative Production Example 4 | Comparative 5 Production Example 5 |
|---|---|---|---|---|---|---|---|---|---|---|
| Styrene-isoprene diblock copolymer (block copolymer B) | | | | | | | | | | |
| Weight average molecular weight of styrene block [Mw($Ar^b$)] | 17000 | 13000 | 16000 | 15500 | 17000 | 12700 | 13000 | 11500 | 18000 | — |
| Weight average molecular weight of isoprene block [Mw($D^b$)] | 96000 | 97000 | 113000 | 82000 | 127000 | 123200 | 90000 | 117300 | 95000 | — |
| Weight average molecular weight [MwB] | 113000 | 110000 | 129000 | 97500 | 144000 | 135900 | 103000 | 128800 | 113000 | — |
| Styrene unit content (%) | 22 | 17 | 18 | 23 | 16 | 12 | 20 | 13 | 23 | — |
| Overall block copolymer composition | | | | | | | | | | |
| MwA/MwB | 1.26 | 1.19 | 1.28 | 1.28 | 0.95 | 1.35 | 2.00 | 1.48 | 1.89 | — |
| Styrene unit content (%) | 26 | 26 | 25 | 38 | 28 | 25 | 20 | 30 | 48 | 40 |
| Block copolymer A/block copolymer B (weight ratio) | 25/75 | 50/50 | 30/70 | 69/31 | 50/50 | 44/56 | 33/67 | 49/51 | 60/40 | 100/0 |
| Performance of hot melt adhesive composition | | | | | | | | | | |
| Loop tack (N) | 18 | 16 | 17 | 14 | 16 | 16 | 18 | 14 | 8 | 4 |
| Adhesion level (N/m) | 740 | 680 | 740 | 650 | 700 | 720 | 800 | 850 | 550 | 380 |
| Holding power (min) | 2500 | 2800 | 3900 | 3400 | 3000 | 400 | 450 | 280 | 310 | 1800 |
| Shear adhesion failure temperature (° C.) | 67 | 68 | 72 | 72 | 68 | 61 | 59 | 60 | 63 | 69 |
| Softening agent holding properties (%) | 98 | 95 | 98 | 93 | 98 | 80 | 75 | 79 | 77 | 85 |
| visible light transmittance (%) | 65 | 64 | 65 | 61 | 64 | 56 | 48 | 54 | 50 | 45 |

Examples 2 to 4 and Comparative Examples 1 to 5

Hot melt adhesive compositions of Examples 2 to 4, Comparative Examples 1 to 4, and Comparative Example 5 were produced in the same manner as in Example 1, except that the composition used was changed to those (block copolymer compositions or block copolymer) obtained in Production Examples 2 to 4, Comparative Production Examples 1 to 4, and Production Example 5, respectively, and evaluations thereof were performed. These results are presented in Table 3.

Example 5

A hot melt adhesive composition of Example 5 was produced in the same manner as in Example 1, except that 50 parts of the block copolymer obtained in Production Example 5 and 50 parts of the block copolymer obtained in Production Example 6 were used together instead of 100 parts of the composition obtained in Production Example 1, and evaluations thereof were performed. These results are presented in Table 3.

As can be seen from Table 3, the hot melt adhesive compositions (Examples 1 to 5) formed using the block copolymer compositions for hot melt adhesive of the present invention, all exhibited high shear adhesion failure temperature (heat resistance), high softening agent holding properties and high transparency, and also exhibited high values for loop tack, peeling adhesion level and holding power. On the other hand, the hot melt adhesive composition that used a styrene-isoprene-styrene triblock copolymer only (Comparative Example 5) exhibited very low shear adhesion failure temperature (heat resistance), softening agent holding properties and transparency. Furthermore, even if a block copolymer composition that included a styrene-isoprene-styrene triblock copolymer and a styrene-isoprene diblock copolymer was used, in a case in which the composition did not have the configuration characteristic to the present invention (Comparative Examples 1 to 4), the hot melt adhesive compositions all exhibited low shear adhesion failure temperature (heat resistance), low softening agent holding properties and low transparency as compared with the hot melt adhesive compositions related to the present invention. From the above results, it can be said that the block copolymer composition of the present invention has excellent softening agent holding properties, heat resistance and transparency, and is also excellent in the fundamental performances required from an adhesive, such as tackiness, adhesion level, and holding power.

The invention claimed is:

1. A block copolymer composition for a hot melt adhesive, comprising a block copolymer A represented by the following formula (A) and a block copolymer B represented by the following formula (B), wherein:
   an aromatic vinyl monomer unit content of the block copolymer A is 30% to 50% by weight;
   an aromatic vinyl monomer unit content of the block copolymer B is 15% to 25% by weight;
   a content of the aromatic vinyl monomer units relative to all polymer components of the block copolymer composition is 18% to 45% by weight;

a weight ratio (A/B) of the block copolymer A with respect to the block copolymer B is 20/80 to 80/20;

a ratio (MwA/MwB) of a weight average molecular weight of the block copolymer A (MwA) with respect to a weight average molecular weight of the block copolymer B (MwB) is 0.65 to 1.5; and the weight average molecular weight of the block copolymer A (MwA) is 110,000 to 208,000; and an overall weight average molecular weight of the block copolymer composition is 94,000 to 200,000:

$$Ar1^a\text{-}D^a\text{-}Ar2^a \quad (A)$$

$$Ar^b\text{-}D^b \quad (B)$$

in the formula (A) and the formula (B), $Ar1^a$ and $Ar^b$ each represent an aromatic vinyl polymer block having a weight average molecular weight of 10,000 to 18,000; $Ar2^a$ represents an aromatic vinyl polymer block having a weight average molecular weight of 20,000 to 40,000, with a difference between the weight average molecular weight of $Ar2^a$ and the weight average molecular weight of $Ar1^a$ being 5,000 to 30,000; and $D^a$ and $D^b$ each represent a conjugated diene polymer block having a weight average molecular weight of 80,000 to 150,000.

2. A hot melt adhesive composition comprising 100 parts by weight of the block copolymer composition for a hot melt adhesive according to claim 1, 30 parts to 800 parts by weight of a tackifying resin, and 10 parts to 500 parts by weight of a softening agent.

3. The hot melt adhesive composition according to claim 2, used as an adhesive for a label.

\* \* \* \* \*